US011211065B2

(12) United States Patent
Godambe et al.

(10) Patent No.: US 11,211,065 B2
(45) Date of Patent: Dec. 28, 2021

(54) SYSTEM AND METHOD FOR AUTOMATIC FILTERING OF TEST UTTERANCE MISMATCHES IN AUTOMATIC SPEECH RECOGNITION SYSTEMS

(71) Applicant: Genesys Telecommunications Laboratories, Inc., Daly City, CA (US)

(72) Inventors: Tejas Godambe, Mumbai (IN); Aravind Ganapathiraju, Hyderabad (IN)

(*) Notice: Subject to any disclaimer, the term of this patent is extended or adjusted under 35 U.S.C. 154(b) by 506 days.

(21) Appl. No.: 16/265,148

(22) Filed: Feb. 1, 2019

(65) Prior Publication Data

US 2019/0244611 A1 Aug. 8, 2019

Related U.S. Application Data

(60) Provisional application No. 62/625,697, filed on Feb. 2, 2018.

(51) Int. Cl.
*G10L 15/00* (2013.01)
*G10L 15/22* (2006.01)
(Continued)

(52) U.S. Cl.
CPC ............. *G10L 15/22* (2013.01); *G10L 15/02* (2013.01); *G10L 15/14* (2013.01); *G10L 15/16* (2013.01);
(Continued)

(58) Field of Classification Search
CPC ... G10L 15/00; G10L 2015/025; G10L 15/02; G10L 2015/022; G10L 2015/027; G10L 15/01; G10L 15/05; G10L 15/08; G10L 2015/085; G10L 15/12; G10L 15/14; G10L 15/142; G10L 15/146; G10L 15/144;
(Continued)

(56) References Cited

U.S. PATENT DOCUMENTS 5,937,384 A * 8/1999 Huang .................. G10L 15/144
704/256
9,972,300 B2 * 5/2018 Raghavendra .......... G10L 13/08
(Continued)

OTHER PUBLICATIONS

P. Lin, D. Lyu, Y. Chang and Y. Tsao, "Temporal alignment for deep neural networks," 2015 IEEE Global Conference on Signal and Information Processing (GlobalSIP), 2015, pp. 108-112, doi: 10.1109/GlobalSIP.2015.7418166. (Year: 2015).*
(Continued)

*Primary Examiner* — Edgar X Guerra-Erazo

(57) ABSTRACT

A system and method are presented for the automatic filtering of test utterance mismatches in automatic speech recognition (ASR) systems. Test data are evaluated for match between audio and text in a language-independent manner. Utterances having mismatch are identified and isolated for either removal or manual verification to prevent incorrect measurements of the ASR system performance. In an embodiment, contiguous stretches of low probabilities in every utterance are searched for and removed. Such segments may be intra-word or cross-word. In another embodiment, scores may be determined using log DNN probability for every word in each utterance. Words may be sorted in the order of the scores and those utterances containing the least word scores are removed.

18 Claims, 4 Drawing Sheets

(51) Int. Cl.
*G10L 15/16* (2006.01)
*G10L 15/02* (2006.01)
*G10L 15/197* (2013.01)
*G10L 15/14* (2006.01)

(52) U.S. Cl.
CPC ...... *G10L 15/197* (2013.01); *G10L 2015/025* (2013.01)

(58) Field of Classification Search
CPC ..... G10L 15/148; G10L 15/16; G10L 15/183; G10L 15/193; G10L 15/197; G10L 15/19; G10L 15/20; G10L 17/18; G10L 17/16; G10L 17/12; G10L 17/14; G10L 17/06; G10L 17/08
See application file for complete search history.

(56) References Cited

U.S. PATENT DOCUMENTS

| | | | | |
|---|---|---|---|---|
| 10,019,990 | B2* | 7/2018 | Li | G10L 19/24 |
| 10,373,612 | B2* | 8/2019 | Parthasarathi | G10L 15/16 |
| 10,388,274 | B1* | 8/2019 | Hoffmeister | G06F 16/24522 |
| 2017/0270919 | A1* | 9/2017 | Parthasarathi | G10L 15/02 |
| 2019/0147854 | A1* | 5/2019 | Li | G10L 15/144 704/256 |
| 2020/0035231 | A1* | 1/2020 | Parthasarathi | G10L 15/02 |

OTHER PUBLICATIONS

Zhang, C., Yu, C., Weng, C., Cui, J., & Yu, D. (Dec. 2018). An exploration of directly using word as acoustic modeling unit for speech recognition. In 2018 IEEE spoken language technology workshop (SLT) (pp. 64-69). IEEE. (Year: 2018).*
Li, J., Zhao, R., Huang, J. T., & Gong, Y. (2014). Learning small-size DNN with output-distribution-based criteria. In Fifteenth annual conference of the international speech communication association. (Year: 2014).*
Cieri, Christopher, et al. "The Fisher Corpus: A resource for the next generations of speech-to-text." LREC, vol. 4, 2004. p. 69-71.
Steven Davis and Paul Mermelstein. "Comparison of Parametric Representations for Monosyllabic Word Recognition in Continuously Spoken Sentences". IEEE Transactions on Acoustics, Speech, and Signal Processing. 1980. 28(4): 357-366.
Duda, Richard O., et al. "Pattern Classification". John Wiley & Sons, Inc., New York. 1973.
Federico, Marcello, et al. "IRSTLM: An Open Source Toolkit for Handling Large Scale Language Models." Interspeech 2008 Incorporating SST08 (Italy). p. 1618-1621.
Fiscus, Jon. "Sclite Scoring Package Version 1.5". US National Institute of Standard Technology (NIST), <http://www1.icsi.berkeley.edu/Speech/docs/sctk-1.2/sclite.htm#sclite_name_0> accessed Mar. 28, 2019.
Gales, Mark JF. "Semi-tied Covariance Matrices for Hidden Markov Models". IEEE Transactions on Speech and Audio Processing. 7(3): 272-281. 1999.
Garafolo, John S. et al. "Timit Acoustic-Phonetic Continuous Speech Corpus." Linguistic Data Consortium 1993. 10 (5):0.
Godfrey, John J, et al. "Switchboard: Telephone Speech Corpus for Research and Development." Acoustics, Speech, and Signal Processing. ICASSP-92., 1992 IEEE International Conference on IEEE, vol. 1, pp. 517-720.
Gopinath, Ramesh A. "Maximum Likelihood modeling with Gaussian Distributions for Classification." Acoustics, Speech, and Signal Processing. Proceedings of the 1998 IEEE Interactional Conference on. IEEE, vol. 2, pp. 661-664.
Hinton, Geoffrey, et al. "Deep Neural networks for Acoustic Modeling in Speech Recognition: The shared views of four research groups." IEEE Signal Processing Magazine 2012. 29(6): 82-97.
Lamere, Paul, et al. "The CMU Sphinx-4 Speech Recognition System". IEEE Intl. Conference on Acoustics, Speech, and Signal Processing (ICASSP 2003), Hong Kong. vol. 1, pp. 2-5.
Leonard, R. "A database for speaker-independent digit recognition". Acoustics, Speech, and Signal Processing, IEEE International Conference on ICASSP 1984. IEEE, vol. 9, pp. 328-331.
Panayotov, Vassil, et al. "Librispeech: an ASR corpus based on public domain audio books." Acoustics, Speech, and Signal Processing (ICASSP), 2015, IEEE International Conference on IEEE, pp. 5206-5210.
Paul, Douglas B. and Janet M. Baker. "The Design for the Wall Street Journal-Based CSR Corpus". Proceedings of the Workshop on Speech and Natural Language. Association for Computational Linguistics, pp. 357-362.
Povey, Daniel, et al. "The Subspace Gaussian Mixture Model: A structured model for speech recognition". Computer Speech & Language 25(2): 404-439.
Povey, Daniel, et al. "The Kaldi Speech Recognition Toolkit." IEEE 2011 Workshop on Automatic Speech Recognition and Understanding. IEEE Signal Processing Society, EPFL-CONF-192584.
Vesely, Karel, et al. "Sequence-discriminative training of deep neural networks". Interspeech 2013. pp. 2345-2349.
Zeiler, Matthew D. "On Rectified Linear Units for Speech Processing". Acoustics, Speech, and Signal Processing (ICASSP), 2013 IEEE International Conference on IEEE, pp. 3517-3521.

* cited by examiner

US 11,211,065 B2

SYSTEM AND METHOD FOR AUTOMATIC FILTERING OF TEST UTTERANCE MISMATCHES IN AUTOMATIC SPEECH RECOGNITION SYSTEMS

BACKGROUND

The present invention generally relates to telecommunications systems and methods, as well as automatic speech recognition systems. More particularly, the present invention pertains to the detection and removal of poor quality testing data within these systems.

SUMMARY

A system and method are presented for the automatic filtering of test utterance mismatches in automatic speech recognition (ASR) systems. Test data are evaluated for match between audio and text in a language-independent manner. Utterances having mismatch are identified and isolated for either removal or manual verification to prevent incorrect measurements of the ASR system performance. In an embodiment, contiguous stretches of low probabilities in every utterance are searched for and removed. Such segments may be intra-word or cross-word. In another embodiment, scores may be determined using log DNN probability for every word in each utterance. Words may be sorted in the order of the scores and those utterances containing the least word scores are removed.

In one embodiment, a method is presented for the automatic filtering of test utterance mismatches between a transcription and an audio signal in automatic speech recognition systems, the method comprising: creating an alignment of the audio signal with the reference transcription; determining Deep Neural Network probabilities for a senone sequence from the alignment; identifying a contiguous stretch of senone probabilities that do not meet a threshold in each utterance; locating a segment of near zero senone probabilities within the contiguous stretch; and removing any of the utterances.

The test utterances comprise data containing longer utterances. Segments are of a predetermined length and may be intra-word or cross-word. The automatic speech recognition system is language independent.

In another embodiment, a method is presented for the automatic filtering of test utterance mismatches between a transcription and an audio signal in automatic speech recognition systems, the method comprising: creating an alignment of the audio signal with the reference transcription; determining a score using log Deep Neural Network probabilities for every word in each utterance of the audio signal; sorting the words in order of their associated scores; and removing the utterances containing problematic words that do not meet a threshold.

The determining of a score is computed as an average of log of senone probabilities over a length of the word. The determining may be performed using the mathematical formula:

$$S_w = \frac{1}{m}\sum_{t=1}^{m} \log p_{senone_t},$$

where m represents a number of senones in a word.

The determining of a score is computed as an average of scores of all phones in a word. The determining may be performed using the mathematical formula $$S_w = \frac{1}{n}\sum_{ph=1}^{n} \frac{1}{m_{ph}}\sum_{t=1}^{m_{ph}} \log p_{senone_t},$$

where n represents a number of phones in a word and $m_{ph}$ represents a number of senones in a phone. The phone score may also be determined as a maximum of log senone probabilities in a phone. The determining may be performed using the mathematical formula $$S_w = \frac{1}{n}\sum_{ph=1}^{n} \frac{1}{m_{ph}} \max_{1 < t < m_{ph}} (\log p_{senone_t})$$

where n represents a number of phones in a word and $m_{ph}$ represents a number of senones in a phone. The automatic speech recognition system is language independent.

DETAILED DESCRIPTION

Figure 1:
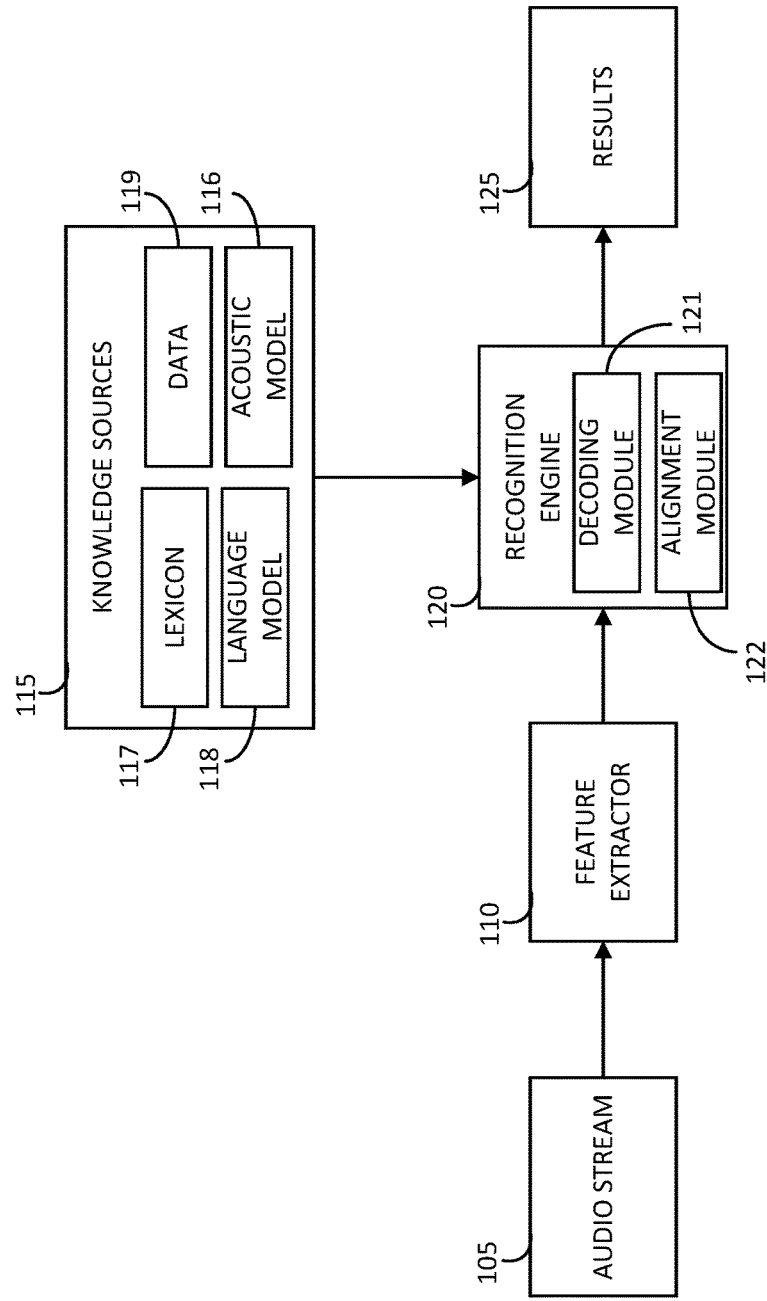
FIG. 1 is a diagram illustrating an embodiment of the basic components of an automatic speech recognition system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Speech recognition accuracy in Automatic Speech Recognition (ASR) systems suffers when the test conditions differ from those captured in the training data. Data may be collected either in-house or purchased from speech data vendors. Regardless of how the data is collected, there is a possibility of the presence of bad data, or problematic instances. Problematic instances in test data directly have an impact on factors such as Word Error Rate (WER) and Sentence Error Rate (SER), to name a few non-limiting examples. For example, a single wrongly transcribed/unintelligible word in a long test utterance can unnecessarily cause a sentence error such as:
 REF: oh one nine six three seven two four eight
 HYP: ZERO one nine six three seven two four eight
 where the speaker said 'zero' in place of 'oh'.

Further, a segment of poor acoustics in the start or middle of a long test utterance can force an ASR system to choose an entirely wrong path, thus creating a possibility that the difference in determined (or computed) and actual word errors can be as large as the total number of words in all the bad utterances. For example:

REF: hey will it's susan hey I just WAS CALLING YOU back I GUESS WE ARE PLAYING PHONE TAG SO CALL ME ALL RIGHT BYE HYP: hey will it's susan hey I just *** ***** ** back * ***  * **** TO YOUR REPLY UM I'M PROBABLY AREN'T The ASR has chosen a wrong path because of poor acoustics in the middle of the utterance after the word 'just', resulting in a larger mismatch and error rate. As such, the removal of the few bad utterances from test data becomes necessary. Large sizes of multiple varieties of test data make manual verification time consuming and almost impossible. Test data used for different languages make manual verification nearly impossible where the developer is unfamiliar with the language under consideration. Efficient and language independent methods to identify the bad test utterances are required due to feasibility of conducting manual verification.

FIG. 1 is a diagram illustrating an embodiment of the basic components of an Automatic Speech Recognition (ASR) system, indicated generally at 100. The basic components of an ASR system 100 may include: an Audio Stream 105; a Feature Extractor 110; Knowledge Sources 115, which may comprise an Acoustic Model 116, a Lexicon 117, a Language Model 118, and Data 119; a Speech Recognition Engine 120, which may comprise a Decoding Module 121 and an Alignment Module 122; and Results 125. In an embodiment, the ASR system may be utilized as part of the media services in a contact center system or a business enterprise system.

In an embodiment, the audio stream 105 may be comprised of the words spoken into the system by a user. The audio stream 105 may be fed into the feature extractor 110, which may convert the audio stream 105 into a representation of the audio stream, or a sequence of spectral features. The signal from the feature extractor 110 may then be fed into a speech recognition engine 120. For example, the task of the speech recognition engine 120 may be to take information from the knowledge sources 115, such as a set of words (also referred to as a lexicon 117) and search through the presented audio stream 105 using the probabilities from the acoustic model 116 to determine the most likely sentence spoken in that audio signal. The acoustic model 116 might comprise a hybrid Deep Neural Network Hidden Markov Model (DNN-HMM). In an embodiment, 13 dimensional MFCC features along with delta and acceleration coefficients (i.e., 39 dimensional features) may be used for building monophone and triphone systems. A subspace Gaussian mixture model (SGMM) may be trained using Linear Discriminant Analysis and Maximum Likelihood Linear Transform (LDA+MLLT) features. The alignments produced by the SGMM system may be used to train the DNN systems having five hidden layers, each containing 1024 nodes. In an embodiment, the input dimension of DNN may be 429 (39 dimensional features with a context window of 11 adjacent frames). The output dimension of DNN may be decided by the number of leaf nodes of the tree built using SGMM. Rectified linearity activation function may be used for all hidden nodes. Softmax activation may be used for the final layer. In an embodiment the DNN system may be first trained with cross-entropy loss function. The alignments produced by this system may then be used to train the final DNN-HMM acoustic model using sequence minimum Bayes risk loss function. The lexicon 117 may be hand-crafted or generated and any number of words may be present in the pronunciation lexicon.

Other components of the knowledge sources 115 might comprise a language model 118 and data 119. The data 119 may comprise one or more of training and test data. Training data may be prepared from a plurality of different corpora. The size of each corpus may vary based on the number of utterances and time. In an example, a corpus might comprise 168,191 utterances and 120 hours. Test data might comprise several benchmarks corresponding to sets of names (each set having a different vocabulary and grammar), phone numbers, other digit sequences, voice commands, and real-world customer data which might be used in an enterprise setting or contact center environment. Additionally, the data 119 may be language independent.

The recognition engine 120 further comprises a decoding module 121 and an alignment module 122. For example, the decoding module 121 serves to decode models. In an embodiment, a decoder from a toolkit (e.g., Kaldi) may be employed with a 2-pass decoding strategy. For example, in the first pass a lattice may be generated for an utterance. In the second pass, the best hypothesis may be derived from the lattice utilizing a scoring tool. The alignment module 122 aligns audio files with text. The Results 125 comprise the recognized words that the audio stream have been converted into by the recognition engine 120. Recognition may occur in real-time.

Figure 2:
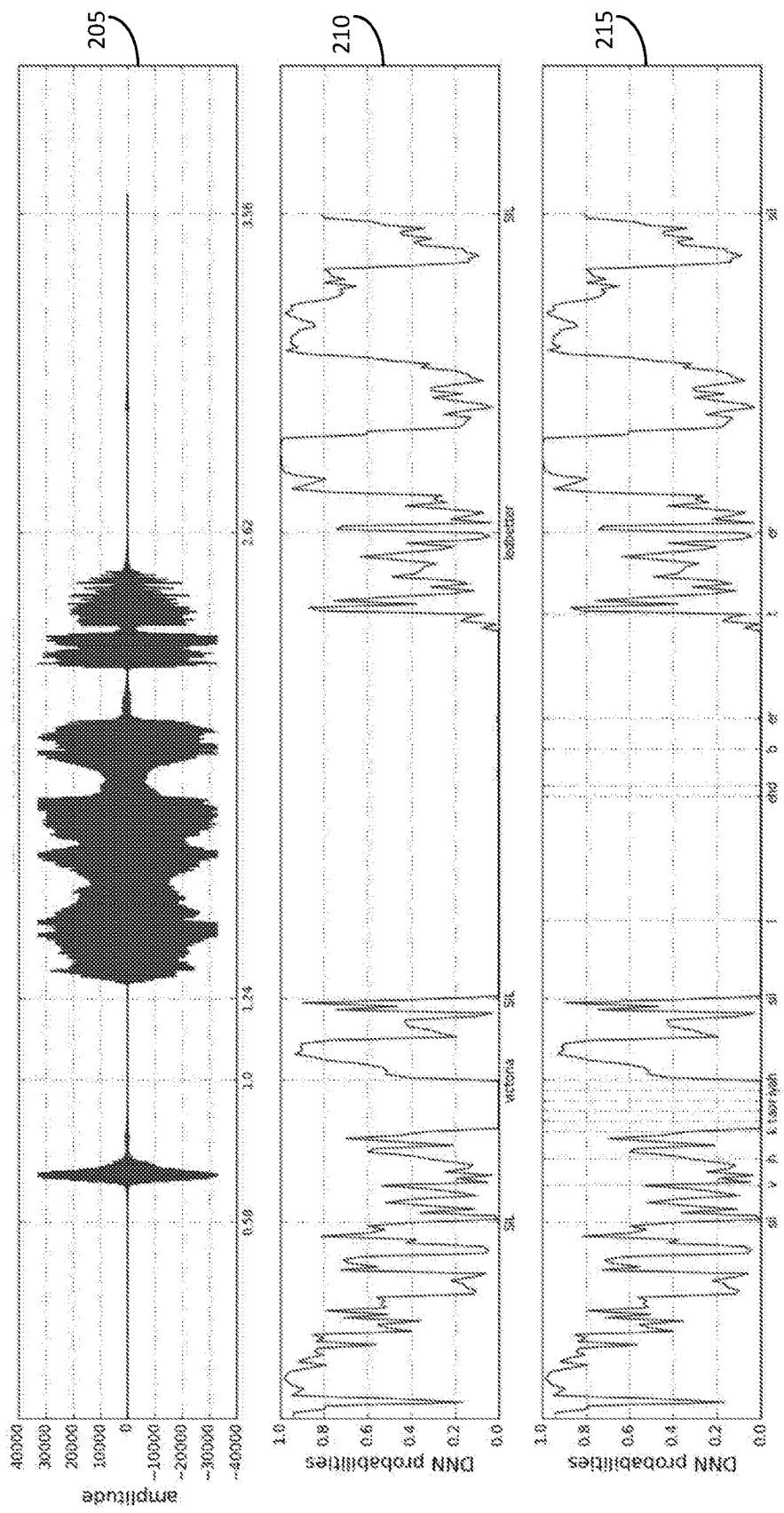
FIG. 2 is a diagram illustrating an embodiment of an audio signal along with word and phone aligned plots of senone probabilities.

FIG. 2 is a diagram illustrating an embodiment of an audio signal along with word and phone aligned plots of senone probabilities, indicated generally at 200. The subplot 205 illustrates an audio signal, where the subplots 210 and 215 illustrate DNN probabilities for the senone sequence obtained by aligning the audio signal with the reference transcription. The subplots 205, 210, and 215 are time aligned in 200. The X-axes of the subplots 205, 210, and 215 are labeled with time (in seconds), word labels, and phone labels respectively. Vertical dotted lines indicate the end time of the words and phones. Reference transcriptions and paths of the audio files may also provide for self-containment and efficient analysis of individual files.

In subplots 210 and 215, a long continuous stretch of near zero DNN probabilities can be seen, indicating the possibility of a large mismatch between audio and reference text. The audio file used for purposes of this exemplary analysis was 'Victoria Ledbetter". In the audio file, the speaker had correctly spoke the name 'Victoria Ledbetter', however, the speaker had given a long pause after speaking 'Vic'. Generally, ASR systems allow optional silence in between two words, but in this example, there is a long intra-word silence. The lexicon did not permit this silence, and hence, subplot 215 illustrates the poor scoring of the phones after 'Vic'. Other problems that might be found resulting in mismatch of audio and text files include: 1) speaker swapping phones while pronouncing a word (for example, the name 'ARRIGO' may be pronounced as 'ARRGIO' in an audio file), 2) the speaker may ask 'has the recording started?', 3) incorrect segmentation of the long audio file comprising several utterances, thus resulting in words required to be present in previous audio file entering the present audio file, 4) speakers recording 'oh' in place of 'zero' and vice-versa in digit sequences (e.g., phone numbers), 5) recording starting late or ending early thus recording incomplete utterances, 6) American English speakers making errors in pronouncing Indian names, and 7) audio clipping, to name some non-limiting examples. These significantly affect WER and SER and need to be removed in order to increase the performance of the ASR system.

In an embodiment, contiguous stretches of very low probabilities in every utterance may be searched for (as illustrated in FIG. 2). DNN probability scores are able to reasonably indicate inconsistency between audio and text. A continuous stretch of near zero probabilities indicates that a series of phones (not necessarily within a word) must be having a problem, which can further lead to misrecognition of a single word or a series of words. An utterance may be rejected based on the length of a contiguous segment of very low senone probabilities and is useful when test data comprises longer utterances, as in the case of large vocabulary speech recognition where there are many short words and many less important words which are not pronounced carefully. Such a segment may be intra-word or cross-word, wherein the below examples determine scores for whole words only.

In another embodiment, a score using log DNN probability may be determined for every word in each utterance, and words may be sorted in the order of these scores. The utterances containing most problematic words (i.e., those with the least word scores) can be removed. For example, the word score may be determined by using the mathematical equation:

$$S_w = \frac{1}{m}\sum_{t=1}^{m} \log p_{senone_t}$$

where m represents the number of senones in a word. A senone may be the same as the number of speech frames. The word score $S_w$ is thus determined as an average of the log of senone probabilities over the length of the word.

In another example, the word score may be determined by using the mathematical equation:

$$S_w = \frac{1}{n}\sum_{ph=1}^{n} \frac{1}{m_{ph}} \sum_{t=1}^{m_{ph}} \log p_{senone_t}$$

where n represents the number of phones in a word and $m_{ph}$ represents the number of senones in a phone. The final word score $S_w$ is thus determined as an average of scores of all phones in a word, where a phone score is calculated as the average of the log senone probabilities over the length of a phone.

In yet another example, the word score may be determined by the mathematical equation:

$$S_w = \frac{1}{n}\sum_{ph=1}^{n} \frac{1}{m_{ph}} \max_{1<t<m_{ph}} (\log p_{senone_t})$$

where n represents the number of phones in a word and $m_{ph}$ represents the number of senones in a phone. The final word score $S_w$ is thus determined as an average of scores of all phones in a word, where a phone score is determined as the maximum of the log of the senone probabilities in a phone. Instead of taking an average of log senone probabilities in a phone, as in a previously described example, the maximum is taken.

Thresholds, or benchmarks may be set to determine how many mismatches may be removed from the data. This may be based on user preference. Automatic filtering of the data within the computer system occurs based on the benchmarks and exhibits improvements in the WER and SER of the ASR system.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 3A, 3B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 3A:
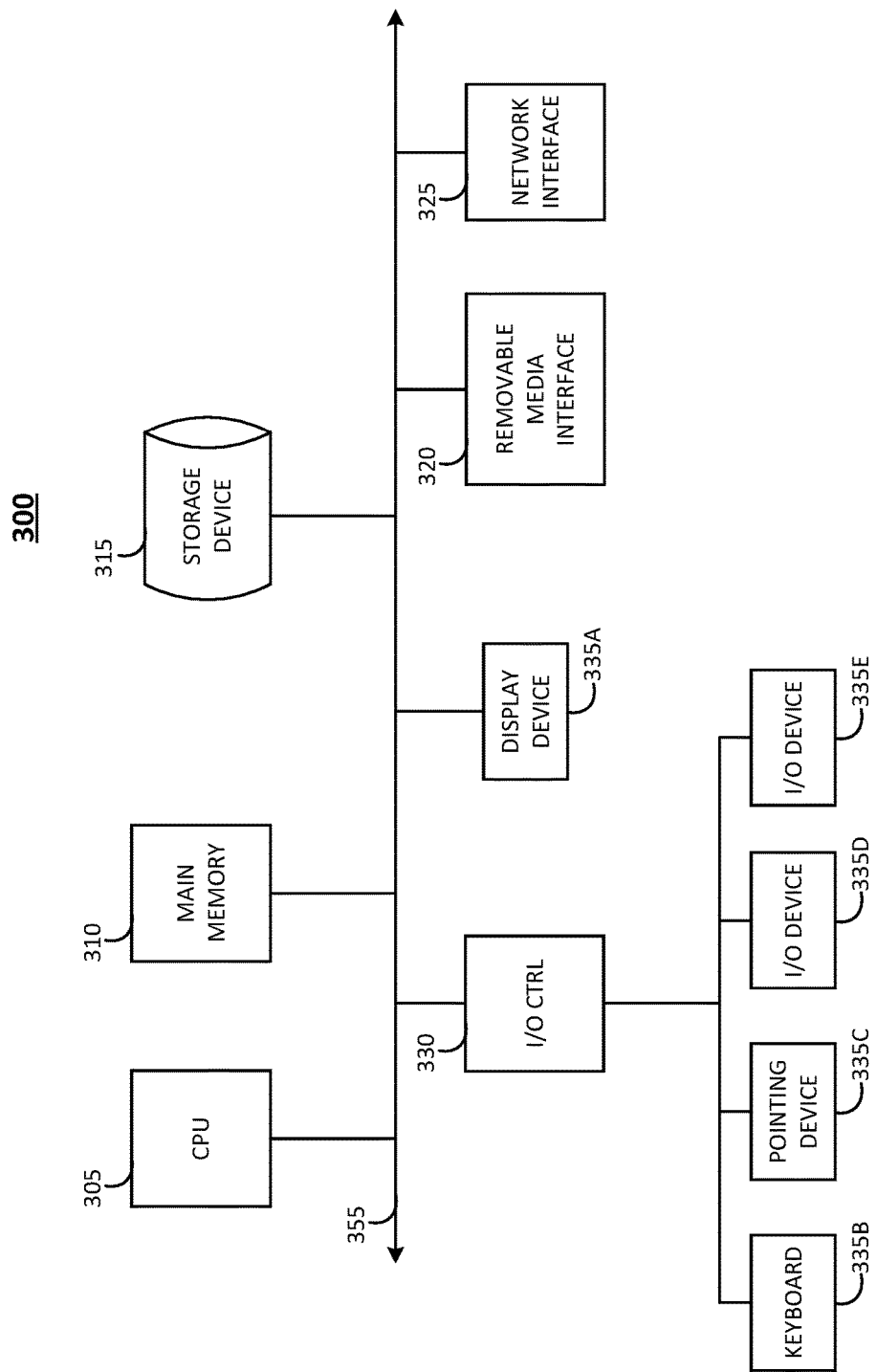
FIG. 3A is a diagram illustrating an embodiment of a computing device.
Figure 3B:
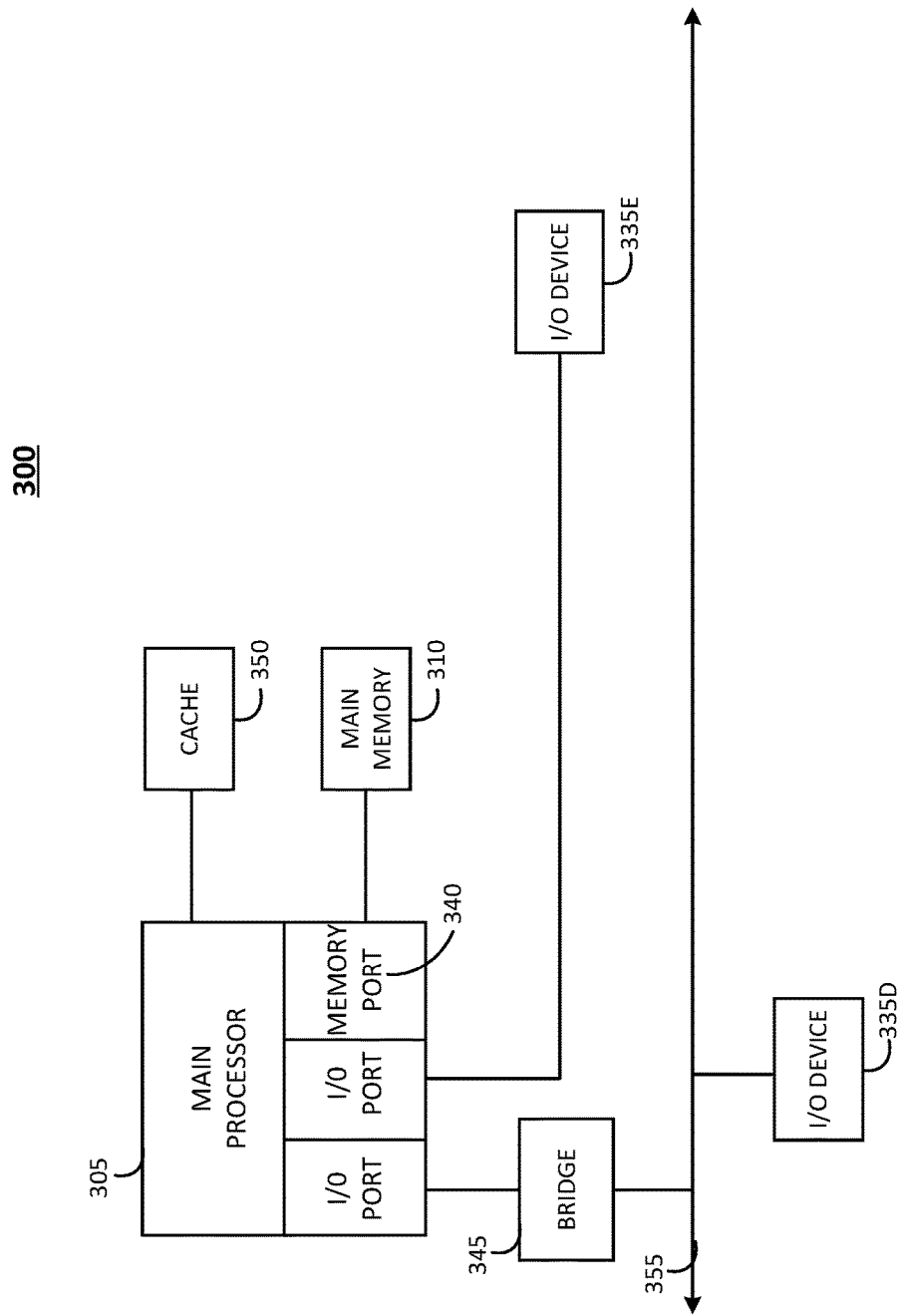
FIG. 3B is a diagram illustrating an embodiment of a computing device.

FIGS. 3A and 3B are diagrams illustrating an embodiment of a computing device as may be employed in an embodiment of the invention, indicated generally at 300. Each computing device 300 includes a CPU 305 and a main memory unit 310. As illustrated in FIG. 3A, the computing device 300 may also include a storage device 315, a removable media interface 320, a network interface 325, an input/output (I/O) controller 330, one or more display devices 335A, a keyboard 335B and a pointing device 335C (e.g., a mouse). The storage device 315 may include, without limitation, storage for an operating system and software. As shown in FIG. 3B, each computing device 300 may also include additional optional elements, such as a memory port

340, a bridge 345, one or more additional input/output devices 335D, 335E, and a cache memory 350 in communication with the CPU 305. The input/output devices 335A, 335B, 335C, 335D, and 335E may collectively be referred to herein as 335.

The CPU 305 is any logic circuitry that responds to and processes instructions fetched from the main memory unit 310. It may be implemented, for example, in an integrated circuit, in the form of a microprocessor, microcontroller, or graphics processing unit, or in a field-programmable gate array (FPGA) or application-specific integrated circuit (ASIC). The main memory unit 310 may be one or more memory chips capable of storing data and allowing any storage location to be directly accessed by the central processing unit 305. As shown in FIG. 3A, the central processing unit 305 communicates with the main memory 310 via a system bus 355. As shown in FIG. 3B, the central processing unit 305 may also communicate directly with the main memory 310 via a memory port 340.

In an embodiment, the CPU 305 may include a plurality of processors and may provide functionality for simultaneous execution of instructions or for simultaneous execution of one instruction on more than one piece of data. In an embodiment, the computing device 300 may include a parallel processor with one or more cores. In an embodiment, the computing device 300 comprises a shared memory parallel device, with multiple processors and/or multiple processor cores, accessing all available memory as a single global address space. In another embodiment, the computing device 300 is a distributed memory parallel device with multiple processors each accessing local memory only. The computing device 300 may have both some memory which is shared and some which may only be accessed by particular processors or subsets of processors. The CPU 305 may include a multicore microprocessor, which combines two or more independent processors into a single package, e.g., into a single integrated circuit (IC). For example, the computing device 300 may include at least one CPU 305 and at least one graphics processing unit.

In an embodiment, a CPU 305 provides single instruction multiple data (SIMD) functionality, e.g., execution of a single instruction simultaneously on multiple pieces of data. In another embodiment, several processors in the CPU 305 may provide functionality for execution of multiple instructions simultaneously on multiple pieces of data (MIMD). The CPU 305 may also use any combination of SIMD and MIMD cores in a single device.

FIG. 3B depicts an embodiment in which the CPU 305 communicates directly with cache memory 350 via a secondary bus, sometimes referred to as a backside bus. In other embodiments, the CPU 305 communicates with the cache memory 350 using the system bus 355. The cache memory 350 typically has a faster response time than main memory 310. As illustrated in FIG. 3A, the CPU 305 communicates with various I/O devices 335 via the local system bus 355. Various buses may be used as the local system bus 355, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 335A, the CPU 305 may communicate with the display device 335A through an Advanced Graphics Port (AGP). FIG. 3B depicts an embodiment of a computer 300 in which the CPU 305 communicates directly with I/O device 335E. FIG. 3B also depicts an embodiment in which local buses and direct communication are mixed: the CPU 305 communicates with I/O device 335D using a local system bus 355 while communicating with I/O device 335E directly.

A wide variety of I/O devices 335 may be present in the computing device 300. Input devices include one or more keyboards 335B, mice, trackpads, trackballs, microphones, and drawing tables, to name a few non-limiting examples. Output devices include video display devices 335A, speakers and printers. An I/O controller 330 as shown in FIG. 3A, may control the one or more I/O devices, such as a keyboard 335B and a pointing device 335C (e.g., a mouse or optical pen), for example.

Referring again to FIG. 3A, the computing device 300 may support one or more removable media interfaces 320, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 335 may be a bridge between the system bus 355 and a removable media interface 320.

The removable media interface 320 may, for example, be used for installing software and programs. The computing device 300 may further include a storage device 315, such as one or more hard disk drives or hard disk drive arrays, for storing an operating system and other related software, and for storing application software programs. Optionally, a removable media interface 320 may also be used as the storage device. For example, the operating system and the software may be run from a bootable medium, for example, a bootable CD.

In an embodiment, the computing device 300 may include or be connected to multiple display devices 335A, which each may be of the same or different type and/or form. As such, any of the I/O devices 335 and/or the I/O controller 330 may include any type and/or form of suitable hardware, software, or combination of hardware and software to support, enable or provide for the connection to, and use of, multiple display devices 335A by the computing device 300. For example, the computing device 300 may include any type and/or form of video adapter, video card, driver, and/or library to interface, communicate, connect or otherwise use the display devices 335A. In an embodiment, a video adapter may include multiple connectors to interface to multiple display devices 335A. In another embodiment, the computing device 300 may include multiple video adapters, with each video adapter connected to one or more of the display devices 335A. In other embodiments, one or more of the display devices 335A may be provided by one or more other computing devices, connected, for example, to the computing device 300 via a network. These embodiments may include any type of software designed and constructed to use the display device of another computing device as a second display device 335A for the computing device 300. One of ordinary skill in the art will recognize and appreciate the various ways and embodiments that a computing device 300 may be configured to have multiple display devices 335A.

An embodiment of a computing device indicated generally in FIGS. 3A and 3B may operate under the control of an operating system, which controls scheduling of tasks and access to system resources. The computing device 300 may be running any operating system, any embedded operating system, any real-time operating system, any open source operation system, any proprietary operating system, any operating systems for mobile computing devices, or any other operating system capable of running on the computing device and performing the operations described herein.

The computing device 300 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 300 may have different processors, operating systems, and input devices consistent with the device.

In other embodiments, the computing device 300 is a mobile device. Examples might include a Java-enabled cellular telephone or personal digital assistant (PDA), a smart phone, a digital audio player, or a portable media player. In an embodiment, the computing device 300 includes a combination of devices, such as a mobile phone combined with a digital audio player or portable media player.

A computing device 300 may be one of a plurality of machines connected by a network, or it may include a plurality of machines so connected. A network environment may include one or more local machine(s), client(s), client node(s), client machine(s), client computer(s), client device (s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 300 communicates with other computing devices 300 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for the automatic filtering of test utterance mismatches between a transcription and an audio signal in automatic speech recognition systems, the method comprising:
   creating an alignment of the audio signal with the reference transcription;
   determining Deep Neural Network probabilities for a senone sequence from the alignment;
   identifying a contiguous stretch of senone probabilities that do not meet a threshold in each utterance;
   locating a segment of near zero senone probabilities within the contiguous stretch; and
   removing any of the utterances.

2. The method of claim 1, wherein the test utterances comprise data containing longer utterances.

3. The segment of claim 1, wherein the segment is of a predetermined length.

4. The segment of claim 3, wherein the segment is intra-word.

5. The segment of claim 3, wherein the segment is cross-word.

6. The method of claim 1, wherein the automatic speech recognition system is language independent.

7. A method for the automatic filtering of test utterance mismatches between a transcription and an audio signal in automatic speech recognition systems, the method comprising:
   creating an alignment of the audio signal with the reference transcription;
   determining a score using log Deep Neural Network probabilities for every word in each utterance of the audio signal;
   sorting the words in order of their associated scores; and
   removing the utterances containing problematic words that do not meet a threshold.

8. Method of claim 7, wherein the determining of a score is computed as an average of log of senone probabilities over a length of the word.

9. The method of claim 8, wherein the determining is performed using the mathematical formula:

$$S_w = \frac{1}{m}\sum_{t=1}^{m} \log p_{senone_t},$$

where m represents a number of senones in a word.

10. The method of claim 7, wherein the determining of a score is computed as an average of scores of all phones in a word.

11. The method of claim 10, wherein the score is determined as an average of log senone probabilities over the length of a phone.

12. The method of claim 10, wherein the determining is performed using the mathematical formula:

$$S_w = \frac{1}{n}\sum_{ph=1}^{n} \frac{1}{m_{ph}} \sum_{t=1}^{m_{ph}} \log p_{senone_t},$$

where n represents a number of phones in a word and $m_{ph}$ represents a number of senones in a phone.

13. The method of claim 7, wherein the determining of a score is computed as an average of scores of all phones in a word.

14. The method of claim 13, wherein the determining is performed using the mathematical formula:

$$S_w = \frac{1}{n}\sum_{ph=1}^{n} \max_{1<t<m_{ph}} (\log p_{senone_t}),$$

where n represents a number of phones in a word and $m_{ph}$ represents a number of senones in a phone.

15. The method of claim 13, where a phone score is determined as a maximum of log senone probabilities in a phone.

16. The method of claim 7, wherein the automatic speech recognition system is language independent.

17. A system for the automatic filtering of test utterance mismatches between a transcription and an audio signal in automatic speech recognition systems, the system comprising:

a processor; and a memory in communication with the processor, the memory storing instructions that, when executed by the processor, causes the processor to:

create an alignment of the audio signal with the reference transcription, determine Deep Neural Network probabilities for a senone sequence from the alignment, identify a contiguous stretch of senone probabilities that do not meet a threshold in each utterance, locate a segment of near zero senone probabilities within the contiguous stretch, and remove any of the utterances.

18. A system for the automatic filtering of test utterance mismatches between a transcription and an audio signal in automatic speech recognition systems, the system comprising:

a processor; and a memory in communication with the processor, the memory storing instructions that, when executed by the processor, causes the processor to:

create an alignment of the audio signal with the reference transcription;

determine a score using log Deep Neural Network probabilities for every word in each utterance of the audio signal;

sort the words in order of their associated scores; and remove the utterances containing problematic words that do not meet a threshold.

* * * * *